United States Patent Office 3,454,569
Patented July 8, 1969

3,454,569
NOVEL PROCESS FOR PREPARING R₂Sn
Carl R. Gloskey, Stirling, N.J., assignor to M & T Chemicals Inc., New York, N.Y., a corporation of Delaware
No Drawing. Filed June 26, 1964, Ser. No. 378,462
Int. Cl. C07f 7/22; C07d 87/22, 7/02
U.S. Cl. 260—345.1
21 Claims

ABSTRACT OF THE DISCLOSURE

In accordance with certain of its aspects, the process of this invention for preparing R₂Sn by the reaction

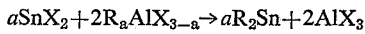

$$aSnX_2 + 2R_aAlX_{3-a} \rightarrow aR_2Sn + 2AlX_3$$

wherein R is a hydrocarbon radical, X is an active halogen, and $a$ is an integer 1–3 may comprise reacting $R_aAlX_{3-a}$ with $SnX_2$ in a reaction mixture containing compound Q selected from the group consisting of tetrahydrofuran, tetrahydropyran, 2-methyl tetrahydropyran, 2-methyl tetrahydrofuran, 2-ethoxy tetrahydropyran, tetrahydrofurfuryl ethyl ether, dihydropyran, and N-methyl morpholine thereby forming product R₂Sn; and recoverong R₂Sn from said reaction mixture.

---

This invention relates to a novel process for preparing organotin compounds. More specifically it relates to a technique for producing diorganotin compounds in high yield.

In accordance with certain of its aspects, the process of this invention for preparing R₂Sn by the reaction

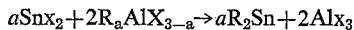

$$aSnX_2 + 2R_aAlX_{3-a} \rightarrow aR_2Sn + 2AlX_3$$

wherein R is a hydrocarbon radical, X is an active halogen, and $a$ is an integer 1–3 may comprise reacting $R_aAlX_{3-a}$ with $SnX_2$ in a reaction mixture containing compound Q selected from the group consisting of tetrahydrofuran, tetrahydropyran, 2-methyl tetrahydropyran, 2-methyl tetrahydrofuran, 2-ethoxy tetrahydropyran, tetrahydrofurfuryl ethyl ether, dihydropyran, and N-methyl morpholine thereby forming product R₂Sn; and recovering R₂Sn from said reaction mixture.

The compounds which may be used in practice of this invention may include $R_aAlx_{3-a}$ wherein $a$ may be integer 1, 2, or 3, and X may be an active halide, preferably chlorine and bromine. The compound $R_aAlx_{3-a}$ may thus include compounds $RAlX_2$, $R_2AlX$, and $R_3Al$, and mixtures thereof.

In this compound, R may be a hydrocarbon radical preferably selected from the group consisting of alkyl, alkenyl, cycloalkyl, aralkyl, aryl, alkaryl, including such radicals when inertly substituted. When R is alkyl, it may typically be straight chain alkyl, or branched alkyl, including methyl, ethyl, n-propyl, isopropyl, n-butyl, isobutyl, sec-butyl, tert-butyl, n-amyl, neopenthyl, isoamyl, n-hexyl, isohexyl, heptyls, octyls, decyls, dodecyls, tetradecyl, octadecyl, etc. Preferred alkyl includes lower alkyl i.e. having less than about 8 carbon atoms i.e. octyls and lower. Where R is alkenyl, it may typically be vinyl, allyl, 1-propenyl, methallyl, buten-1-yl, buten-2-yl, buten-3-yl, penten-1-yl, hexenyl, heptenyl, octenyl, decenyl, dodecenyl, tetradecenyl, octadecenyl, etc. When R is cycloalkyl, it may typically be cyclopentyl, cyclohexyl, cycloheptyl, cyclooctyl, etc. When R is aralkyl, it may typically be benzyl, β-phenylethyl, γ-phenylpropyl, β-phenylpropyl, etc. When R is aryl, it may typically be phenyl, naphthyl, etc. When R is alkaryl, it may typically be tolyl, xylyl, p-ethylphenyl, p-nonylphenyl, etc. R may be inertly substituted e.g. may bear a non-reactive substituent such as alkyl, aryl, cycloalkyl, aralkyl, alkaryl, alkenyl, ether, halogen, nitro, ester, etc. Typical substituted alkyls include 3-chloro-propyl, 2-ethoxyethyl, carboethoxymethyl, etc. Substituted alkenyls include 4-chlorobutyl, γ-phenylpropenyl, chloroallyl, etc. Substituted cycloalkyls include 4-methylcyclohexyl, 4-chlorocyclohexyl, etc. Inertly substituted aryl includes chlorophenyl, anisyl, biphenyl, etc. Inertly substituted aralkyl includes chlorobenzyl, p-phenylbenzyl, p-methylbenzyl, etc. Inertly substituted alkaryl includes 3 - chloro-5-methylphenyl, 2,6-di - tert-butyl-4-chlorophenyl, etc.

Typical illustrative compounds $R_aAlx_{3-a}$ may include: methyl aluminum dichloride, methyl aluminum dibromide, ethyl aluminum dichloride, ethyl aluminum dibromide, n-propyl aluminum dichloride, n-propyl aluminum dibromide, i-propyl aluminum dichloride, n-butyl aluminum dichloride, i-butyl aluminum dichloride, n-amyl aluminum dichloride, n-amyl aluminum dibromide, n-hexyl aluminum dichloride, 2-ethylhexyl aluminum dichloride, n-octyl aluminum dibromide, vinyl aluminum dichloride, allyl aluminum dichloride, cyclohexyl aluminum dichloride, phenyl aluminum dichloride, phenyl aluminum dibromide, dimethyl aluminum chloride, diethyl aluminum chloride, diethyl aluminum bromide, di-n-propyl aluminum chloride, di-i-propyl aluminum chloride, di-n-butyl aluminum chloride, di-i-butyl aluminum chloride, di-n-amyl aluminum bromide, di-n-amyl aluminum chloride, di-n-hexyl aluminum chloride, di-n-octyl aluminum bromide, di-2-ethylhexyl aluminum chloride, divinyl aluminum chloride, diallyl aluminum chloride, dicyclohexyl aluminum chloride, dicyclohexyl aluminum bromide, diphenyl aluminum chloride, trimethyl aluminum, triethyl aluminum, tri-n-propyl aluminum, tri-i-propyl aluminum, tri-n-butyl aluminum, tri-i-butyl aluminum, tri-n-amyl aluminum, tri-n-octyl aluminum, tri-2-ethylhexyl aluminum, trivinyl aluminum, triallyl aluminum, tricyclohexyl aluminum, triphenyl aluminum.

The preferred compounds which may be employed may be R₃Al and preferably those wherein R may be lower alkyl. Tributyl aluminum and tri-n-octyl aluminum may be preferred.

The preferred compound $SnX_2$ may be stannous chloride or stannous bromide. Preferably the X may be the same in $SnX_2$ as in $R_aAlX_{3-a}$, and preferably chlorine.

In practice of the process of this invention, $SnX_2$ and $R_aAlX_{3-a}$ may be reacted in the presence of compound Q as hereinafter designated.

The compound Q as this expression is used herein for the purpose of brevity, include cyclic ethers containing 5–6 members in the ring with at least one hydrogen atom attached to each carban atom in the ring and having the formula

wherein X is a methylene group or a N-alkyl group; R″ is an unsubstituted saturated divalent aliphatic hydrocarbon radical; R′ is an ethylene radical, an ethylenically unsaturated divalent hydrocarbon radical, a methylene radical, or =CHR‴, (R‴ being hydrogen or an aliphatic radical); and O is oxygen. When X is N-alkyl, the ring shall contain 6 members with X and O in a position 1:4 with respect to each other.

Compounds within this definition include tetrohydrofuran, tetrahydropyran, 2-methyltetrahydrofuran, 2-ethoxytetrahydropyran, tetrahydrofurfuryl ethyl ether, dihydropyran, and N-methylmorpholine (including such compounds when inertly substituted). The compound Q may bear as substituent, inert groups, i.e. groups which are not reactive with organoaluminum halides, or with any of the components and products of the reaction mixtures of the present process. Illustrative inert substituents may include substituted and unsubstituted alkyl, aryl, alkoxy, and aryloxy groups (including those bearing substituents thereon which are unreactive to other components of the reaction mixture as herein specified). Where nitrogen replaces a carbon atom in the ring at X, the nitrogen atom must be substituted with a group, such as an alkyl group, which is unreactive to the reactants or reaction products.

It is a characteristic of compound Q that the oxygen is available for electron donation, i.e. the free π-electrons present on the oxygen are available for coordination with the organoaluminum halide. Any large blocking groups on the carbon atoms adjacent to the ring oxygen may impair the availability of these electrons and the reactivity of the compound for forming a complex and assisting in the reaction. In addition to the compounds listed above as being suitable for compound Q, other equivalent compounds satisfying the requirements for this complexing agent and solvent will be apparent to those skilled in the art from the present specification. Since compound Q may also function as a solvent, a compound Q which has a high melting point may be used in practice of this invention, but if it is used as solvent, the high melting point (e.g. above 90° C.) may cause difficulty in carrying out the reaction. Preferably, Q may be present in the amount of at least about 2 moles of Q per mole of $R_aAlCl_{3-a}$. Excess Q over this amount may be employed and the excess may serve as the reaction solvent. If desired, an inert hydrocarbon solvent such as cyclohexane, benzene, xylene etc. may be employed as reaction solvent in place of or in addition to the excess compound Q.

The various components of the reaction mixture e.g. $R_aAlX_{3-a}$ may form complexes with and in a solution of Q e.g. $R_3Al \cdot nQ$ in Q wherein $n$ is a small integer, typically 1–3. Both reactants and products may exist as complexes with one or more moles of Q, for example $SnCl_2 \cdot nQ$; $R_2Sn \cdot Q$; $AlX_3 \cdot nQ$, etc. For purpose of convenience, the reaction equations may be written without reference to compound Q which may be present.

The reaction may preferably be carried out (preferably under inert atmosphere e.g. nitrogen) by adding to a reaction vessel the $R_aAlX_{3-a}$ to be used in the reaction in the form of a 10%–50%, say 25% by weight solution in compound Q. To the reaction vessel, preferably equipped with agitation, thermometer, and reflux condenser, there may be added preferably slowly and with agitation, the $SnX_2$ preferably in the form of a 5%–30%, say 15% solution by weight in Q. The $SnX_2$ will be added to the reaction vessel in equivalent amount ±10% i.e. in amount of about $a$ moles ±10% for each two moles of $R_aAlX_{3-a}$.

Addition may be carried out slowly over 30–60 minutes, say 30 minutes at 25° C.–65° C.–35° C. After completion of addition, the reaction mixture may be stirred at ambient temperature for 30–60 minutes, say 60 minutes. Hydrolysis may be effected by cooling and diluting with 75–100 parts, say 100 parts of water at 20° C.–60° C., say 25° C. preferably containing acid, say hydrochloric acid in amount sufficiently to yield at 1%–10%, say 5% solution.

During addition, the following reaction may occur:

$$aSnX_2 + 2R_aAlX_{3-a} \rightarrow aR_2Sn + 2AlX_3 \quad (1)$$

or more specifically:

$$3SnX_2 + 2R_3Al \rightarrow 3R_2Sn + 2AlX_3 \quad (2)$$

or $$SnX_2 + R_2AlX \rightarrow R_2Sn + AlX_3 \quad (3)$$

or $$SnX_2 + 2RAlX_2 \rightarrow R_2Sn + 2AlX_3 \quad (4)$$

or typically $$3SnCl_2 + 2(i-Bu)_2Al \rightarrow 3(i-Bu)_2Sn + 2AlCl_3 \quad (5)$$

The solution of product $R_2Sn$ in compound Q may be separated from the reaction mixture and dried. The reaction mixture may be extracted with extracting liquid, typically compound Q, hydrocarbon such as hexane, etc., or ether such as ethyl ether, and the extract combined with the separated solution, which may then be dried. Product $R_2Sn$ may be recovered from the dried extract by distillation.

The solution of product $R_2Sn$ in the form of its complex with Q may preferably be recovered as such. This complex is useful as an intermediate in the preparation of other organotin compounds such as $R_2SnCl_2$, etc. The solution of $R_2Sn \cdot nQ$ in Q is a preferred composition because of its relatively high stability and ease of handling. The solutions are typically colored, and the presence of the characteristic color is a reliable indication of the presence of the desired compound. Colors may vary depending on substituents, but the preferred complexes wherein R is lower alkyl are typically a deep green.

Practice of this invention may be apparent from inspection of the following examples wherein all parts are parts by weight unless otherwise specified:

EXAMPLE 1

$$2(i-Bu)_3Al + 3SnCl_2 \rightarrow 3(i-Bu)_2Sn + 2AlCl_3$$

The entire reaction was run under nitrogen atmosphere. A solution of 11.9 parts (0.06 mole) of triisobutylaluminum in 45 parts of tetrahydrofuran was placed in a three-neck flask, equipped with an air motor, stirrer, thermometer, Y-tube adapter, addition funnel, water condenser, and drying tube. With stirring, a solution of stannous chloride 17 parts (0.09 mole) in 90 parts of tetrahydrofuran was added slowly to the flask over a 30 minute period with the temperature remaining between 30–35° C. After the first few drops, the solution turned a very dark green. The mixture was stirred for an additional one hour at room temperature and then refluxed for 45 minutes longer.

Upon cooling the mixture to room temperature, 100 parts of a 5% HCl solution was added slowly, the temperature rising to 60° C. during the addition. When the resulting solution was tested for the presence of diisobutyltin, a yield of 0.034 moles (38% of theory) was found.

EXAMPLE 2

$$2(i-Bu)_3Al + 3SnCl_2 \rightarrow 3(i-Bu)_2Sn + 2AlCl_3$$

A comparative example was carried out not in accordance with the process of the instant invention. The entire reaction was run under a nitrogen atmosphere. Stannous chloride, 11.3 parts (0.06 mole), and 38.5 parts of cyclohexane were charged into a three-neck flask, equipped with an air motor, stirrer, thermometer, Y-tube adapter, addition funnel, water condenser, and a drying tube. With stirring, a solution of 7.88 parts (0.04 moles) of triisobutylaluminum in 38.5 parts of cyclohexane was added over a 30 minute period into the flask with the temperature remaining between 32° C.–35° C. The color of the solution progressively changed from light yellow to dark amber. Solid sodium chloride, 2.34 parts (0.04 moles), was added in one portion and the mixture was stirred for an additional one hour at room temperature. During this period, the color of the mixture became much darker. 120 parts of 5% HCl was added to the mixture. An ice-water bath was used to keep the temperature between 30° C.–35° C.

After diluting the mixture with 77 parts of cyclohexane, compressed air was passed into the mixture for 30 minutes with the color changing from dark amber to a light yellow. 95 parts of concentrated aqueous ammonia was added and the white precipitate which formed was collected and dried in a circulatory oven at 50° C. for several hours. The yield of product was less than 0.5 g. (3.3%).

EXAMPLE 3

$$SnCl_2 + 2n-BuAlCl_2 \rightarrow (n-Bu)_2Sn + 2AlCl_3$$

The entire reaction was run under a nitrogen atmosphere. A solution of 27 parts (0.18 mole) of n-butylaluminum dichloride in 50 ml. of tetrahydrofuran was placed in a three-neck flask, equipped with an air motor, stirrer, thermometer, Y-tube adapter, addition funnel, water condenser, and drying tube. With stirring, a solution of stannous chloride 17 parts (0.09 mole) in 90 parts of tetrahydrofuran was added slowly to the flask over a 30 minute period with the temperature remaining between 30° C.-35° C. After the first few drops, the solution turned a very dark green. The mixture was stirred for an additional one hour at room temperature and then refluxed for 45 minutes longer.

Upon cooling the mixture to room temperature, 100 parts of a 5% HCl solution was added slowly, the temperature rising to 60° C. during the addition. The mixture was diluted with 43.5 parts of benzene and the benzene layer was separated and the aqueous layer extracted once with 43.5 parts of benzene. The product solution was isolated and tested for di-n-butyltin. The results indicated a yield of 0.068 moles of product (75% of theory).

Although this invention has been illustrated by reference to specific examples, numerous changes and modifications thereof which clearly fall within the scope of the invention will be apparent to those skilled in the art.

I claim:

1. The process for preparing $R_2Sn$ by the reaction $aSnX_2 + 2R_aAlX_{3-a} \rightarrow aR_2Sn + 2AlX_3$ wherein R is a radical selected from the group consisting of alkyl, alkenyl, cycloalkyl, aralkyl, aryl, alkaryl, including such radicals when inertly substituted with non-reactive substituents selected from the group consisting of alkyl, aryl, cycloalkyl, aralkyl, alkaryl, alkenyl, ether, halogen, nitro, and ester, X is an active halogen selected from the group consisting of chlorine and bromine, and $a$ is an integer 1–3 which comprises reacting $R_aAlX_{3-a}$ with $SnX_2$ in a reaction mixture containing compound Q selected from the group consisting of tetrahydrofuran, tetrahydropyran, 2-methyl tetrahydropyran, 2-methyl tetrahydrofuran, 2-ethoxy tetrahydropyran, tetrahydrofurfuryl ethyl ether, dihydropyran, and N-methyl morpholine thereby forming product $R_2Sn$; or $R_2SnQ$ and recovering $R_2Sn$ from said reaction mixture.

2. The process for preparing $R_2Sn$ by the reaction of $SnX_2$ with $R_aAlX_{3-a}$ as claimed in claim 1 wherein Q is tetrahydrofuran.

3. The process for preparing $R_2Sn$ by the reaction of $SnX_2$ with $R_aAlX_{3-a}$ as claimed in claim 1 wherein R is alkyl.

4. The process for preparing $R_2Sn$ by the reaction of $SnX_2$ with $R_aAlX_{3-a}$ as claimed in claim 1 wherein R is lower alkyl.

5. The process for preparing $R_2Sn$ by the reaction of $SnX_2$ with $R_aAlX_{3-a}$ as claimed in claim 1 wherein $a$ is 3 and $R_aAlX_{3-a}$ is $R_3Al$.

6. The process for preparing $R_2Sn$ by the reaction of $SnCl_2$ with $R_aAlCl_{3-a}$ wherein R is a radical selected from the group consisting of alkyl, alkenyl, cycloalkyl, aralkyl, aryl, alkaryl, including such radicals when inertly substituted with non-reactive substituents selected from the group consisting of alkyl, aryl, cycloalkyl, aralkyl, alkaryl, alkenyl, ether, halogen, nitro, and ester and $a$ is an integer 1–3 which comprises reacting $R_aAlCl_{3-a}$ with $SnCl_2$ in a reaction mixture containing compound Q selected from the group consisting of tetrahydrofuran, tetrahydropyran, 2-methyl tetrahydropyran, 2-methyl tetrahydrofuran, 2-ethoxy tetrahydropyran, tetrahydrofurfuryl ethyl ether, dihydropyran, and N-methyl morpholine thereby forming product $R_2Sn$ or $R_2SnQ$; and recovering $R_2Sn$ from said reaction mixture.

7. The process for preparing $R_2Sn$ by the reaction of $SnCl_2$ with $R_aAlCl_{3-a}$ as claimed in claim 6 wherein Q is tetrahydrofuran.

8. The process for preparing $R_2Sn$ by the reaction of $SnCl_2$ with $R_aAlCl_{3-a}$ as claimed in claim 6 wherein Q is 2-methyl tetrahydrofuran.

9. The process for preparing $R_2Sn$ by the reaction of $SnCl_2$ with $R_aAlCl_{3-a}$ as claimed in claim 6 wherein Q is tetrahydropyran.

10. The process for preparing $R_2Sn$ by the reaction of $SnCl_2$ with $R_aAlCl_{3-a}$ as claimed in claim 6 wherein R is alkyl.

11. The process for preparing $R_2Sn$ by the reaction of $SnCl_2$ with $R_aAlCl_{3-a}$ as claimed in claim 6 wherein R is lower alkyl.

12. The process for preparing $R_2Sn$ by the reaction of $SnCl_2$ with $R_aAlCl_{3-a}$ as claimed in claim 6 wherein R is butyl.

13. The process for preparing $R_2Sn$ by the reaction of $SnCl_2$ with $R_aAlCl_{3-a}$ as claimed in claim 6 wherein $a$ is 1 and $R_aAlCl_{3-a}$ is $RAlCl_2$.

14. The process for preparing $R_2Sn$ by the reaction of $SnCl_2$ with $R_aAlCl_{3-a}$ as claimed in claim 6 wherein $a$ is 2 and $R_aAlCl_{3-a}$ is $RAlCl$.

15. The process for preparing $R_2Sn$ by the reaction of $SnCl_2$ with $R_aAlCl_{3-a}$ as claimed in claim 6 wherein $a$ is 3 and $R_aAlCl_{3-a}$ is $R_3Al$.

16. A compound $R_2Sn \cdot nQ$ wherein R is a radical selected from the group consisting of alkyl, alkenyl, cycloalkyl, aralkyl, aryl, alkaryl, including such radicals when inertly substituted with non-reactive substituents selected from the group consisting of alkyl, aryl, cycloalkyl, aralkyl, alkaryl, alkenyl, ether, halogen, nitro, and ester; $n$ is an integer selected from the group consisting of 1, 2, and 3; and Q is selected from the group consisting of tetrahydrofuran, tetrahydropyran, 2-methyl tetrahydropyran, 2-methyl tetrahydrofuran, 2-ethoxy tetrahydropyran, tetrahydrofurfuryl ethyl ether, dihydropyran, and N-methyl morpholine.

17. A compound as claimed in claim 16 wherein Q is tetrahydrofuran.

18. A compound as claimed in claim 16 wherein R is lower alkyl.

19. A compound as claimed in claim 16 wherein $n$ is 1–3.

20. A compound as claimed in claim 16 wherein R is butyl.

21. A composition comprising a solution of a compound $R_2Sn \cdot nQ$ in a solvent Q wherein R is a radical selected from the group consisting of alkyl, alkenyl, cycloalkyl, aralkyl, aryl, alkaryl, including such radicals when inertly substituted with non-reactive substituents selected from the group consisting of alkyl, aryl, cycloalkyl, aralkyl, alkaryl, alkenyl, ether, halogen, nitro and ester; $n$ is an integer selected from the group consisting of 1, 2, and 3; and Q is selected from the group consisting of tetrahydrofuran, tetrahydropyran, 2-methyl tetrahydropyran, 2-methyl tetrahydrofuran, 2-ethoxy tetrahydropyran, tetrahydrofurfuryl ethyl ether, dihydropyran, and N-methyl morpholine.

References Cited

UNITED STATES PATENTS 2,867,566   1/1959   Weinberg _____ 260—242

U.S. Cl. X.R.

260—242, 346.1, 429.7